June 4, 1963 D. B. McCORMICK 3,091,837
METHOD AND APPARATUS FOR MAKING FLEXIBLE BELTS
Filed March 23, 1960 3 Sheets-Sheet 1
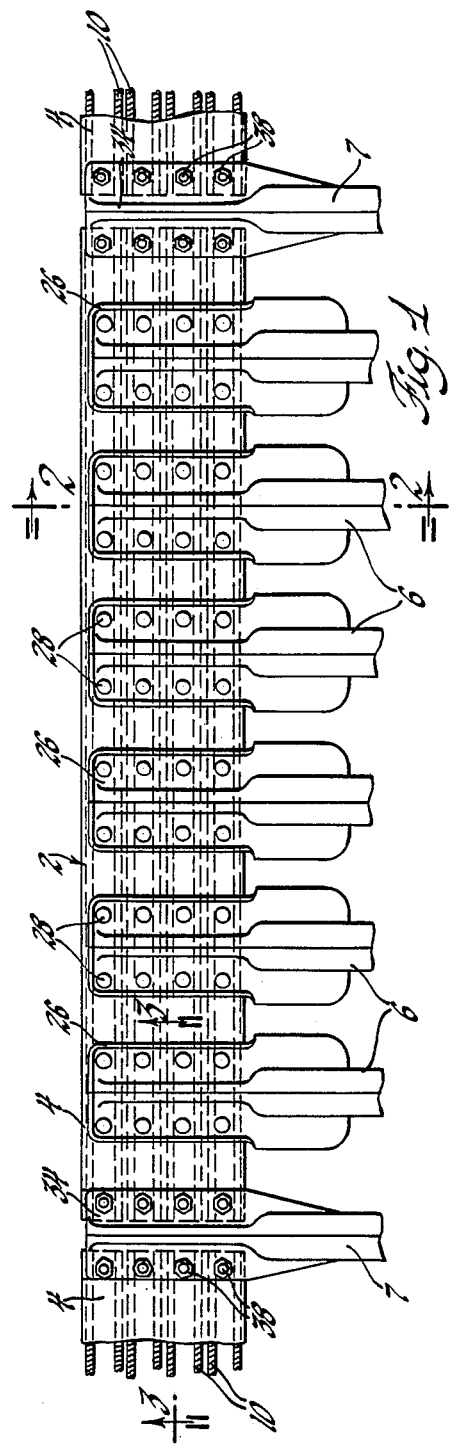
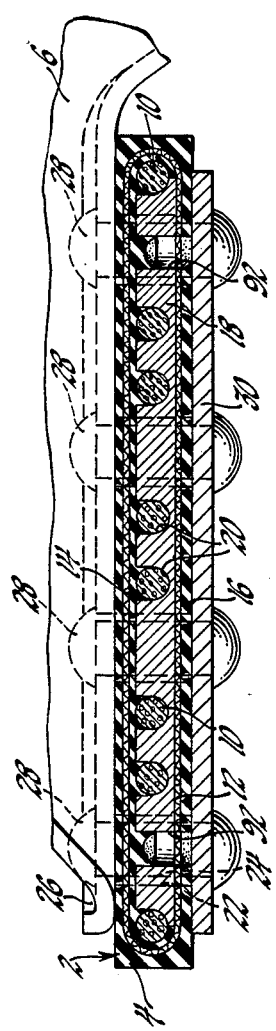
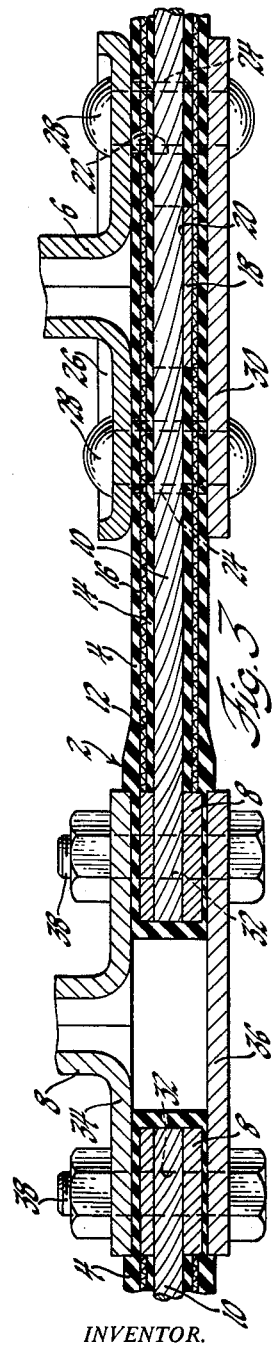
INVENTOR.
Dale B. McCormick
BY
ATTORNEY June 4, 1963  D. B. McCORMICK  3,091,837
METHOD AND APPARATUS FOR MAKING FLEXIBLE BELTS
Filed March 23, 1960  3 Sheets-Sheet 2

INVENTOR.
Dale B. McCormick
BY
ATTORNEY

June 4, 1963  D. B. McCORMICK  3,091,837
METHOD AND APPARATUS FOR MAKING FLEXIBLE BELTS
Filed March 23, 1960  3 Sheets-Sheet 3

INVENTOR.
Dale B. McCormick
BY
J.E. McGlynn Jr.
ATTORNEY

United States Patent Office 3,091,837
Patented June 4, 1963

3,091,837
METHOD AND APPARATUS FOR MAKING FLEXIBLE BELTS
Dale B. McCormick, Detroit, Mich., assignor to General Motors Corporation, Detroit, Mich., a corporation of Delaware
Filed Mar. 23, 1960, Ser. No. 17,047
3 Claims. (Cl. 29—148.3)

This invention relates to light-weight endless flexible belts and, in particular, to a method and apparatus for manufacturing such belts.

In the art of track-laying vehicles, light-weight flexible tracks have been developed comprising a plurality of laterally fixedly spaced endless flexible belts straddling longitudinally spaced vehicle wheels, and between which belts there are connected a plurality of circumferentially spaced track shoes or bars having an inner portion for entrainment about the vehicle wheels and an oppositely disposed ground-engaging cleat or grouser portion. While such light-weight track constructions are commonly used with various types of military vehicles, they are not exclusively employed therewith but, rather, are to be found on light-weight track-laying commercial or civilian vehicles for towing purposes in snow, ice, swamp areas, and the like, and as a means for transportation in arctic and desert regions. For a further illustration and description of such an endless track structure, reference may be made to the United States Patent No. 2,786,725 issued to Maurice A. Thorn on March 26, 1957. As will be obvious to those skilled in the art, and as may be noted from a consideration of the patent aforementioned, each of the laterally spaced flexible belts which are interconnected by spaced track shoes or bars actually consists of a plurality of flexible belt sections connected in end-to-end relation. Each such belt section of each endless belt includes a pair of spaced rigid connector bars between which there are stretched a plurality of wire cables having the opposite ends thereof suitably rigidly secured to the aforementioned connector bars. This cable assembly is wrapped within a suitable rubberized or otherwise flexible fabric which is then cured or molded about the cables to form a flexible belt section. It will be understood that a plurality of such flexible belt sections are adapted to be connected in end-to-end relation by means of connection of adjacent connector bars of each belt section to form each endless flexible belt of the track structure, the wire cables being relied upon as the principal load-bearing means of the track structure.

Several serious problems have been encountered in such prior art belt structures. In the first place, it has been found that after a plurality of the flexible belt sections have been interconnected to form the endless flexible belt, one or more but less than all of the plurality of cables of each belt section have carried a substantial portion of the load imposed upon the track structure, rather than having these loads equally divided among the plurality of cables which is the ideal condition. Under such circumstances, cable breakage occurs usually resulting in failure of the track. Additionally, either during the molding or curing process or during the period of operation on the track, or both, the cables have a tendency to move relative to each other thereby resulting in the cables fraying through the fabric of the belt section or themselves being frayed upon contact with the means passing through the belt section for fastening the track shoes or bars thereto. Irrespective of the source of the problem, the result has been that one or more of the cables have been weakened by fraying, or that the flexible fabric of the belt section has been torn permitting the egress of water and other elements thereto tending to deteriorate the track sections.

It is an object and feature of this invention to provide a method for manufacturing such a belt section whereby the means for fastening together adjacent flexible belt sections of the endless flexible belt assembly are located in a predetermined position relative to the load-bearing cables whereby substantially equal loads will be imposed on the cables during use of the track structure.

It is a further object and feature of this invention to provide a method of the type aforedescribed which additionally includes curing or molding a flexible rubberized fabric about a cable assembly while maintaining the latter in laterally fixed relationship to avoid subsequent fraying of the cable or rubberized fabric.

It is yet another object and feature of this invention to provide an apparatus for pre-tensioning the plurality of cables of a given belt section, and locating a row of holes in each connector bar of the track section whereby the latter may be connected in an endless track in a manner whereby substantially equal loads will be borne by the cables while the track is in use.

These and other objects of the invention will become more apparent hereinafter as the description of the invention proceeds, and in which reference is made to the drawings in which:

FIGURE 1 is a fragmentary plan view of one endless belt of an endless track structure of the type including a plurality of such belts laterally spaced from each other and interconnected by spaced track bars or shoes;

FIGURE 2 is an enlarged view taken on line 2—2 of FIGURE 1;

FIGURE 3 is an enlarged view taken on line 3—3 of FIGURE 1;

Figure 4:
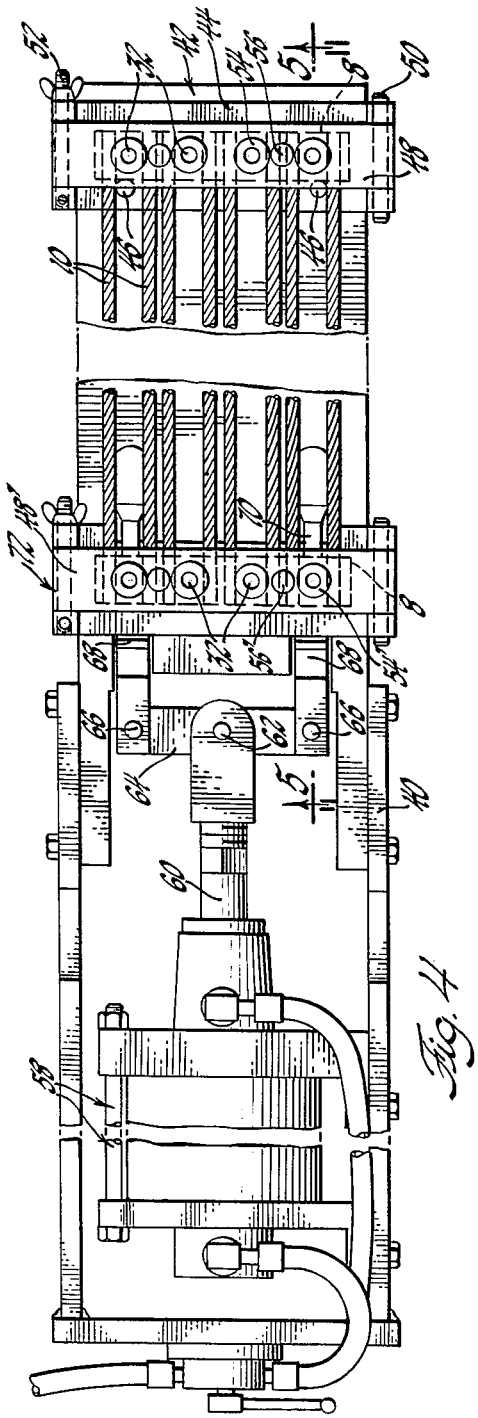
FIGURE 4 is a plan view of an apparatus for pre-tensioning the cables of each belt section of the endless belt or track, and for providing the spaced connector bars thereof with apertures for receipt of suitable fasteners in connecting the belt section in the belt or track.

Referring now to the drawings, FIGURE 1 illustrates a portion of an endless flexible track of the type comprising a plurality of laterally fixedly spaced endless flexible belt assemblies 2, each of which includes a plurality of flexible belt sections 4 connected in end-to-end relation. Two or more of such endless belt assemblies 2 are adapted to be connected in substantially laterally fixed relation with each other by means of a plurality of spaced track bars or shoes 6, the master track bars 7 being utilized to interconnect the adjacent ends of respective flexible belt sections 4 to form the endless flexible belt. As will be apparent to those skilled in the art, the opposite ends of the track bars or shoes shown in FIGURE 1 are likewise rigidly secured in a manner to be described to an identical endless belt composed of flexible belt sections 4 connected in end-to-end relation.

Each flexible belt section 4 of the endless flexible belts 2 comprises the spaced rigid metal end or connector bars 8 between which there are stretched a plurality of load-bearing wire cables 10 having their opposite ends suitably rigidly secured as by swaging to the end or connector bars 8. This cable assembly is imbedded within a flexible mass preferably consisting of one or more layers of a suitable fabric 12 such as nylon which, during manufacture, is coated on one surface with a conventional and well-known high tensile adhesion rubber stock and on its other surface with an equally well known and conventional tire tread stock. During the manufacture of the flexible assembly as will appear hereinafter, the coated fabric aforedescribed is cured about the cables 10 to form the assembly shown particularly in FIGURE 2 consisting of the adhesion stock 14 immediately surrounding the cables 10 within the fabric 12 and the tire tread stock 16 exteriorly thereof. Also imbedded within the rubberized fabric aforedescribed are a plurality of spaced laterally extending spacer members 18 which may be made of relatively rigid nylon, metal or the like, and provided with a plurality of laterally spaced semi-circular seats 20 generally conforming to the curvature of the respective cables 10 to receive and retain the latter in laterally fixed relation relative to each other. As will appear immediately hereafter, each spacer 18 is associated in a particular manner with each track bar 6.

Each belt section 4 also includes a plurality of pairs of laterally extending rows of openings or apertures 22 adapted to receive the hollow cylindrical metal ferrules 24 aligned with similar rows of apertures on the attaching or end plates 26 of each of the track shoes or bars 6. Suitable fastening means such as the rivets 28 are adapted to rigidly clampingly engage the belt section 4 between the track bar attaching plates 26 and the plates 30 on the opposite side of the belt section. It is important to note that each of the spacer members 18 is located immediately between the attaching plates 26 and 30 and are straddled by each pair of fasteners 28. The significance of this location is that the portion of the flexible belt clamped between the attaching members 26 and 30 is relatively inflexible during operation of the entire endless track upon the vehicle. Consequently, there is little if any flexure of the rubberized fabric or the cables 20 in the area of the spacer members 18 to cause fraying of the cables or the rubberized fabric itself.

Each of the rigid end or connectors bars 8 which are connected to the cables 10 has formed therein a laterally extending row of holes or apertures 32 so that the respective connector bars of adjacent belt sections may be drawn into close proximity and joined together by means of a master track bar 8. Thus, each master track bar is provided with an attaching member or plate 34 at a side edge thereof which is provided with parallel rows of apertures alignable with the apertures 32 in the end connectors of the adjacent belt sections. An attaching plate 36 spans the end connectors 8 of adjacent belt sections 4 and suitable fasteners such as the bolts 38 extend between the plates 34 and 36 to rigidly and clampingly engage the adjacent ends of the adjacent belt sections. In this regard, it is important to note that the row of apertures 32 in each of he end connectors 8 is in a predetermined position with respect to the cables 20 so as to insure that the latter carry substantially equal loads when mounted within the endless track and placed upon the vehicle. The manner in which these apertures in the end connectors are so positioned will become apparent from the exposition to follow.

From the preceding description, it may be seen that each endless flexible belt 2 of the endless track structure comprises a plurality of belt sections 4 interconnected in end-to-end relationship, and that the cables 10 of each belt section will carry substantially equal portions of the load imposed upon the track, while the spacer members 18 of each belt section are located between the associated clamping or attaching plates 26 and 30 between each pair of rows of fastener members 28.

Figure 5:
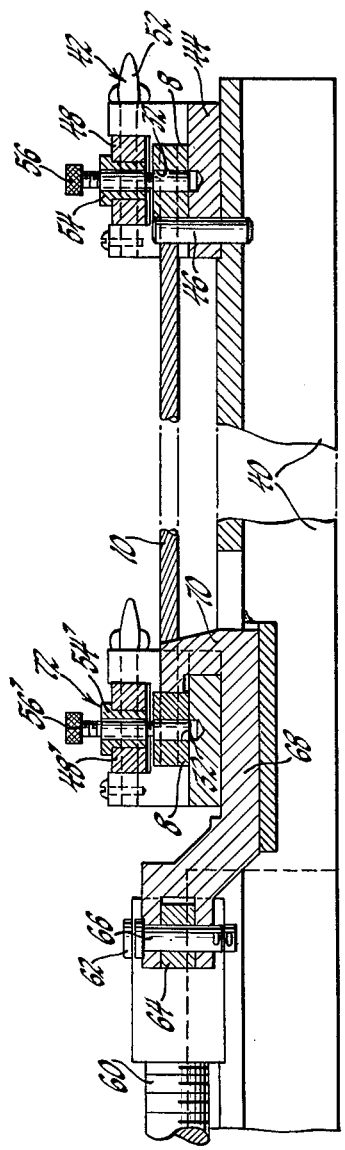
FIGURE 5 is a fragmentary view taken on line 5—5 of FIGURE 4.

Referring now to FIGURES 4 and 5, there is shown an apparatus for pre-tensioning the plurality of cables 10 of each belt section, and for locating the rows of apertures 32 in each end connector 8 whereby substantially equal tension or loads will be imposed upon the individual cables as loads are imposed on the endless belt of which the belt section is a part. The aforementioned apparatus comprises an elongated bed 40 upon which the drill fixture 42 is secured. This fixture 42 includes a base member 44 through which a pair of laterally spaced vertically upstanding dowels or pins 46 project. An upper hinge strap 48 is pivotally connected at 50 to the base member 44, and extends laterally across the bed for locking engagement with the base member 44 by means of the fastener 52. The upper hinge strap includes a plurality of openings arranged in a laterally extending row and adapted to receive the drill bushings 54 and, spaced between each pair of drill bushings, there is a locating screw 56 adapted to be removably threaded toward the base 44 of the fixture.

At the opposite end of the bed 40, there is provided a fluid-operated double acting jack or piston and cylinder mechanism 58 having the piston rod 60 thereof articulately connected on a vertical axis indicated at 62 to a cross head 64 having its opposite ends pivotally connected on vertical axes as indicated at 66 to tensioning brackets 68 reciprocably disposed upon the bed 40. The brackets 68 include upstanding arms 70 adapted to engage another drill fixture 72 substantially identical to that previously described and, accordingly, like numerals have been utilized to indicate corresponding parts thereof.

It will be noted from a consideration of FIGURES 4 and 5 that the end bar or connector 8 at one end of a cable assembly may be seated upon the base of the drill fixture 42 to one side of the dowels or pins 46 and the hinge strap 48 which mounts the drill bushings 54 lowered thereover and locked in place by the fastening means 52. Tension aplied upon the cables 10 will move the connector bar 8 into abutting engagement with the pins 46 while the vertically positioned locating screws 56 have been screwed down upon the top surface of the connector bar 8 to maintain the latter flush upon base member 44.

In similar fashion, the connector bar 8 at the opposite ends of the cables is seated within the drill fixture 72 so as to be engaged by the fingers or arms 70 carried by the brackets 68. The upper hinge bar or strap 48' containing the drill bushing 54' is then locked in place and the locating screws 56' tightened down for the purpose aforementioned.

The fluid-operated jack or ram 58 is then actuated to reciprocate the piston rod 60 to the left in FIGURES 4 and 5, thereby moving the drill fixture 72 along the bed of the apparatus. Because of the articulated connections between the piston rod 60 and cross head 64 and between the latter and the bracket members 68, the end connector 8 mounted within the fixture 72 is permitted to pivot or swivel in a horizontal plane until such time as a substantially equal and predetermined tension is imposed on each of the cables 10 as measured by a suitable instrument, not shown.

When the predetermined condition of tension in the cables is obtained, a suitable drill may then be operated in association with each of the drill bushings 54 and 54' lying over each of the end connectors 8 to form the apertures 32 in the latter for connection in the endless belt as shown in FIGURES 1 and 3 and as previously described. Preferably, as each aperture 32 is drilled, a locating pin not shown may be inserted therein during drilling of the other apertures. Thus, the cables are pretensioned to a predetermined and substantial equal value, and then the apertures or openings 32 which subsequently receive the fasteners 38 for fastening the track bars 8 between adjacent belt sections 4 are located in rows in a predetermined position with respect to the cables whereby the latter will bear substantially equal loads. After this operation is performed, the jack 58 may be operated in a reverse direction to create cable slack, the upper hinge bars 48 and 48' of the respective drill fixtures 42 and 72 opened, and the cable assembly removed from the apparatus.

Figure 6:
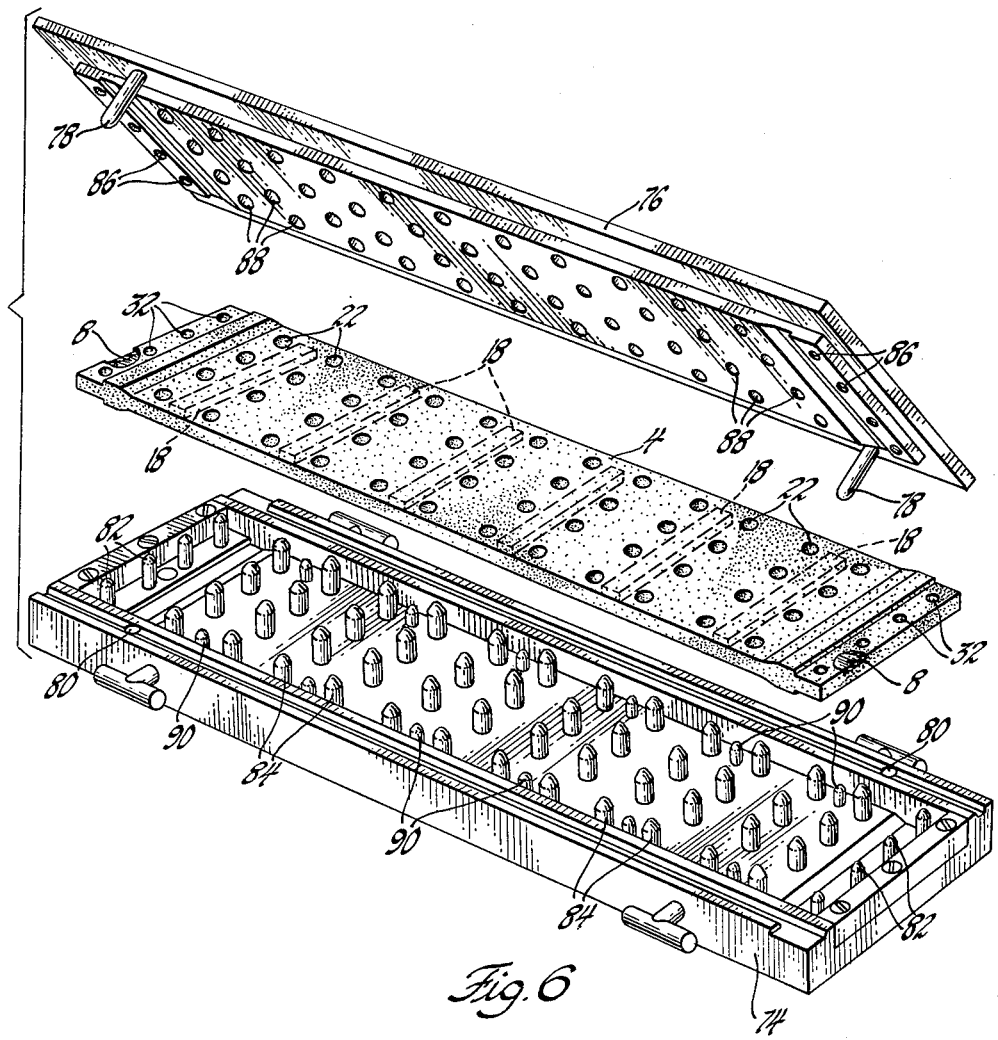
FIGURE 6 is an exploded perspective view of a high pressure curing mold used in the manufacture of a given belt section of such an endless belt or track.

The next step in the manufacture of the flexible belt section 4 is to cure or mold suitable flexible or rubberized fabric about the cable assembly consisting of the cables 10 and end connectors 8 and the spaced members 18 shown particularly in FIGURE 2. To this end, FIGURE 6 illustrates a more or less conventional high pressure mold including a bottom member 74 and a top member 76 having locating pins or dowels 78 at opposite corners thereof for insertion in similarly formed recesses 80 in the lower member to orient these members with respect to each other. At opposite ends of the bottom mold member 74, the laterally extending rows of vertically upstanding dowels or pins 82 are adapted to receive the apertures 32 in the connector bars 8 previously described. Additionally, a plurality of pairs of laterally extending rows of dowels or pins 84 upstand from the base of the bottom mold member 74 so as to form the rows of holes or apertures 22 in the flexible belting during the curing process for receipt of the ferrules 24 and rivets 22 in connecting the track bars 6 to the belting as previously described. The upper mold member 76, as will be obvious, includes suitable recesses 86 and 88 for receipt of the locating pins 82 for the end connectors and the dowels 84 for forming the rows of apertures 22 intermediate the ends of the belting, while insuring that the upper mold member may fit flush upon the lower mold member. Between each pair of rows of dowels 84 in the lower mold member 74, there are provided two smaller spaced upstanding dowel members 90 adapted to receive locating apertures 92 within each of the spacer members 18 (see FIGURE 2) whereby the latter are located between each pair of rows of apertures 22 used for connecting track bars 6.

The flexible mass which is cured about the cables 10 and spacer members 18 is formed according to conventional practice. Thus, as previously indicated with respect to FIGURE 2, a suitable number of layers of high strength fabric 12 such as nylon is coated on one side with a well-known high tensile adhesion stock 14 such as rubber. The other side of the fabric is similarly coated with a suitable tire tread stock 16. A punch is utilized to form holes in the fabric for subsequent insertion upon the dowels 82, 84 and 90, and the fabric is cut to proper length. The assembled fabric is then prepared for curing to the cable assembly.

To this end, the prepared fabric is placed within the bottom member 74 of the mold with the pre-punched holes received by dowels 82, 84 and 90. The spacer members 18 are located upon the dowels or pins 90, the end connectors 8 are located upon the dowels 82 and the cables extending therebetween are seated within the seats 20 of the spacer members 18. The prepared fabric is then folded over the cable assembly and spacer members so that the fabric splice indicated in FIGURE 2 preferably will be on the ground-engaging side of the belt section. The upper mold member 76 is then fitted into place and the complete assembly is cured in accordance with procedures well known to the art. After curing, the flexible band section 4 is removed from the mold and trimmed.

The individual flexible belt sections 4 so manufactured are then ready to be connected in end-to-end relation by means of the master track bars 7, and the track bars 6 connected thereto in the manner previously described.

In view of the foregoing description, it may be seen that the belt section 4 of this invention is characterized by a plurality of cables 10 stretched between the end connectors 8 having apertures 32 formed therein in predetermined relation with respect to the cables whereby the latter will sustain substantially equal loads during use. Moreover, the spacer members 18, located as they are between the attaching plate 26 of each track shoe 6 and the lower attaching plate 30 and between the rows of rivets 28, insure avoidance of undue fraying of the cables or fabric inasmuch as this portion of the flexible rubberized mass is subjected to substantially no flexure during use. Additionally, the method and apparatus disclosed in conjunction with FIGURES 4 and 5 insure that the location of the rows of connecting apertures 32 in the end bars 8 will be properly related with respect to the cables 10 to insure substantial equalization of loads borne by the latter. Finally, the use of the spacer members 18 insures that the cables will not be displaced laterally relative to each other during the high pressure molding or curing operation.

Inasmuch as other forms of the invention will now become apparent to those skilled in the art, it will be understood that the embodiments shown in the drawings are merely for illustrative purposes and are not intended to limit the scope of the invention, which is defined by the claims which follow.

I claim:

1. In the manufacture of an endless flexible belt of the type including a plurality of said sections connected in end-to-end relation, the method comprising forming each of said sections by rigidly connecting the opposite ends of a plurality of individual load-bearing cables to rigid connector bars, fixing one of said bars and moving the other of said bars relative thereto until substantially a predetermined equal tension is imposed on each of said cables, and forming a row of openings in each of said bars in a predetermined position relative to said cables under tension, and then joining said sections in end-to-end relation by means of said openings to thereby insure substantial equalization of loads borne by the cables.

2. In the manufacture of an endless flexible belt of the type including a plurality of said sections connected in end-to-end relation, the method comprising forming each of said sections by rigidly connecting the opposite ends of a plurality of individual load-bearing cables to rigid connector bars, fixing one of said bars and moving the other of said bars relative thereto until substantially a predetermined equal tension is imposed on each of said cables, forming a row of openings in each of said bars in a predetermined position relative to said cables under tension, placing said cables in a flexible material, and molding said flexible material about said cables while maintaining the latter in laterally fixedly spaced relationship, and then joining said sections in end-to-end relation by means of said openings to thereby insure substantial equalization of loads borne by the cables.

3. Apparatus for manufacturing a cable assembly for an endless flexible belt of the type including a plurality of said assemblies connected in end-to-end relation, each of said assemblies including a pair of spaced rigid connector bars and a plurality of load-bearing cables extending between and having their respective ends secured to a respective bar, said apparatus comprising first support means for fixing one of said connector bars relative to the other of said bars, second support means for supporting and moving the other of said bars relative to said one bar to impose substantially equal tension on each of said cables, said second support means comprising a pair of laterally spaced support brackets movable relative to said first support means and adapted to support the other of said bars laterally therebetween, a cross head having spaced points thereon respectively pivotally connected to said respective brackets, means pivotally connected to said cross head equidistantly from the pivotal connections of the latter to said brackets to move the latter relative to said first support means, and means carried by the first and second support means for locating a row of laterally extending openings in each of said connector bars in predetermined relationship with respect to said cables under tension whereby substantially equal loads will be imposed on said cables with said assembly connected in said belt.

References Cited in the file of this patent

UNITED STATES PATENTS

| | | |
|---|---|---|
| 2,338,819 | Mayne | Jan. 11, 1944 |
| 2,494,108 | Sinclair | Jan. 10, 1950 |
| 2,592,916 | Leguillon | Apr. 15, 1952 |
| 2,637,895 | Blaton | May 12, 1953 |
| 2,864,154 | Sausaman | Dec. 16, 1958 |
| 2,918,271 | Crites | Dec. 22, 1959 |